United States Patent
Hanson

(12) 
(10) Patent No.: US 6,381,325 B1
(45) Date of Patent: Apr. 30, 2002

(54) SYSTEM AND METHOD FOR WIRELESS DIRECTORY ASSISTANCE

(75) Inventor: Daniel A. Hanson, Dallas, TX (US)

(73) Assignee: Operator Service Co., Lubbock, TX (US)

( * ) Notice: Subject to any disclaimer, the term of this patent is extended or adjusted under 35 U.S.C. 154(b) by 0 days.

(21) Appl. No.: 09/158,399

(22) Filed: Sep. 22, 1998

(51) Int. Cl.$^7$ .............. H04M 3/42; H04M 15/00
(52) U.S. Cl. .............. 379/218.01; 379/114.2; 379/114.01; 379/260
(58) Field of Search ............... 379/260, 88.01, 379/67.1, 218.01, 201.01, 219, 242, 262, 220.01, 221.01, 223, 229, 233, 114.01, 114.05, 114.2, 114.17, 114.24

(56) References Cited

U.S. PATENT DOCUMENTS

| | | | |
|---|---|---|---|
| 5,353,335 A | * 10/1994 | D'Urso et al. | 379/67 |
| 5,509,049 A | 4/1996 | Peterson | 379/218.01 |
| 5,559,871 A | * 9/1996 | Smith | 379/115 |
| 5,613,006 A | 3/1997 | Reese | 379/67.1 |
| 5,684,867 A | 11/1997 | Gesslein, Jr. et al. | 379/114.14 |
| 5,737,700 A | 4/1998 | Cox et al. | 455/414 |
| 6,052,439 A | * 4/2000 | Gerszberg et al. | 379/88.01 |
| 6,149,353 A | * 11/2000 | Nilsson | 405/409 |
| 6,157,648 A | * 12/2000 | Voit et al. | 370/401 |

* cited by examiner

Primary Examiner—Fan Tsang
Assistant Examiner—Ovidio Escalante
(74) Attorney, Agent, or Firm—Brian F. Russell; Bracewell & Patterson, L.L.P.

(57) ABSTRACT

A method of providing wireless directory assistance service includes the steps of receiving a call placed by a caller at a telecommunications carrier switch, routing the call to a call management platform coupled to the telecommunications carrier switch. A directory assistance service provider is contacted via the telecommunications carrier switch or via a frame relay network. The call is then split from the call to the directory assistance service provider. The call management platform then receives a destination number from the directory assistance service provider and supplies it to the caller in a voice announcement. The destination number may be received in-band or via the frame relay network. The call management platform waits a predetermined time period and then automatically connects the call to the destination number via the telecommunications carrier switch if the call has not been disconnected within the predetermined time period.

17 Claims, 4 Drawing Sheets

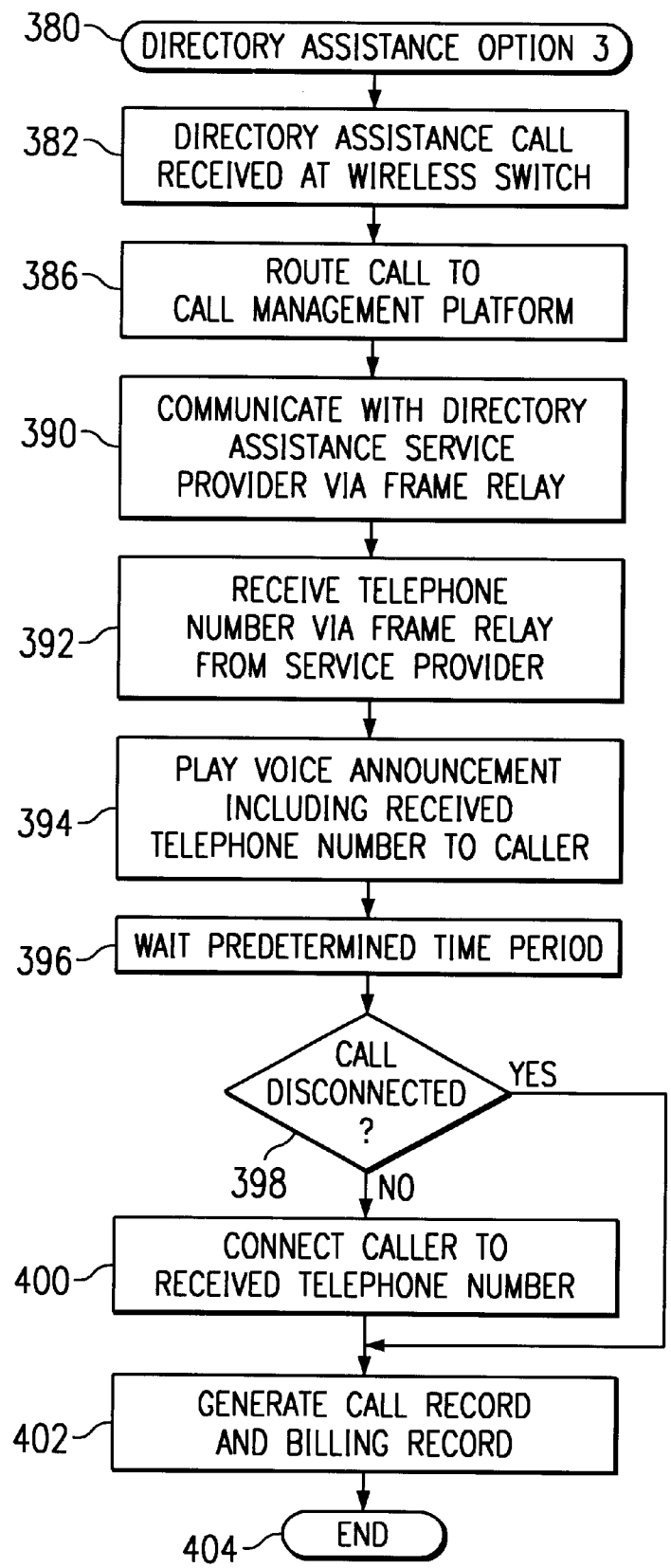

SYSTEM AND METHOD FOR WIRELESS DIRECTORY ASSISTANCE

TECHNICAL FIELD OF THE INVENTION

This invention is related in general to the field of telecommunications. More particularly, the invention is related to a system and method for wireless directory assistance.

BACKGROUND OF THE INVENTION

Directory assistance is the service of providing a customer a telephone number for a party specified by the customer. The customer may supply a name and a city location of the party to the directory assistance operator, and the operator then looks up that party's telephone number in a computer database and provides the telephone number to the customer. Most recently, the operator, upon locating the telephone number, would activate a pre-recorded voice announcement to convey the telephone number to the customer. Some directory service providers further offer to connect the customer to the telephone number for a predetermined fee.

Currently, directory assistance calls made by wireless customers are routed from the wireless switch to a centralized directory assistance service provider. Because the directory assistance service provider may service customers within a large geographical area, the call to the directory assistance service provider is usually a long-distance call, which may be routed through one or more switches. If the customer is then connected to the destination telephone number by the directory assistance service provider, then the call from the customer to the destination number is routed through the wireless switch, one or more switches to the directory assistance service provider, and then one or more switches to the destination number. The last leg of the path from the directory assistance service provider to the destination number may also be routed through one or more switches. Therefore, it may be seen that a single call takes up a disproportionate amount of bandwidth to route the call.

SUMMARY OF THE INVENTION

Accordingly, there is a need for an efficient method of providing wireless directory assistance service to the customers.

In one aspect of the invention, a method of providing wireless directory assistance service includes the steps of recognizing a wireless call placed by a caller at a telecommunications carrier switch, routing the wireless call to a call management platform coupled to the telecommunications carrier, and a directory assistance service provider is contacted via the telecommunications carrier switch or via a frame relay network. The wireless call is then split from the call to the directory assistance service provider. The call management platform then receives a destination number from the directory assistance service provider and supplies it to the caller in a voice announcement. The destination number may be received in-band or via the frame relay network. The call management platform waits a predetermined time period and then automatically connects the wireless call to the destination number via the telecommunications carrier switch if the wireless call has not been disconnected within the predetermined time period.

BRIEF DESCRIPTION OF THE DRAWINGS

For a better understanding of the present invention, reference may be made to the accompanying drawings, in which:

FIG. 5 is a flowchart of yet another embodiment of an exemplary directory assistance call processing according to the teachings of the present invention.

DETAILED DESCRIPTION OF THE INVENTION

Figure 1:
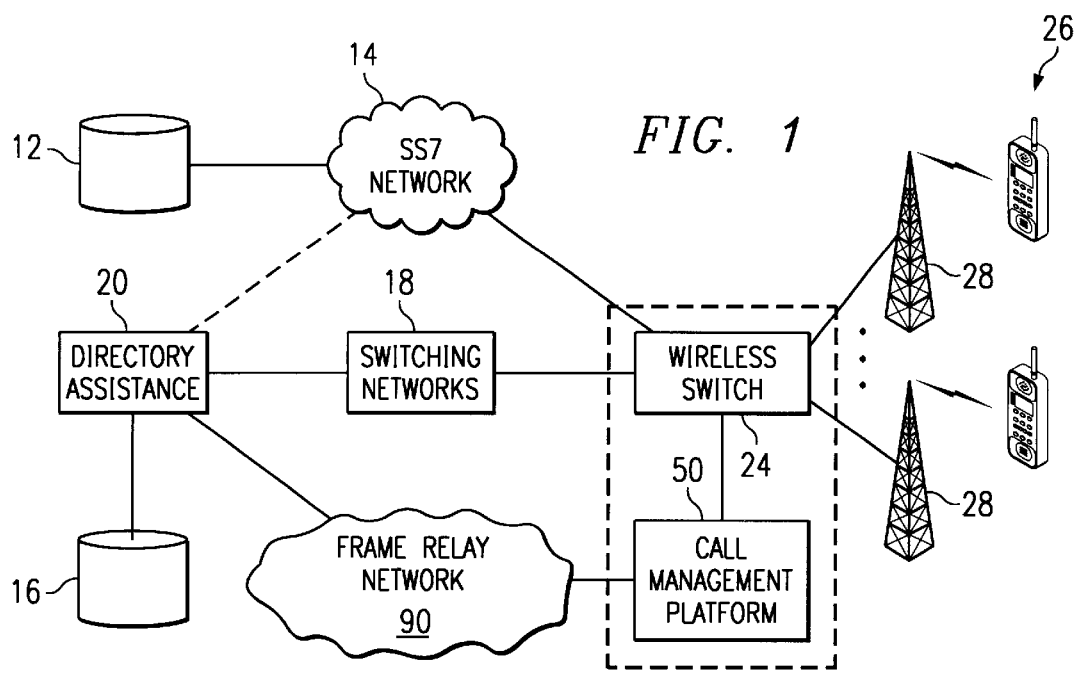
FIG. 1 is a block diagram of an exemplary telecommunications network according to the teachings of the present invention.

The preferred embodiments of the present invention are illustrated in FIGS. 1–5, like reference numerals being used to refer to like and corresponding parts of the various drawings.

Referring to FIG. 1, a block diagram of an exemplary telecommunications network 10 according to the teachings of the present invention is shown. Telecommunications network 10 is preferably constructed pursuant to the Advanced Intelligent Network (AIN) architecture. Telecommunications network 10 includes an SS7 network 14 that may include service control point (SCP), databases 12, signal transfer point (STP), and other nodes, which are not shown in FIG. 1. SS7 network 14 is coupled to switching networks 18 which may include switches and cross-connect systems, also not shown.

A wireless telephone system 22 is coupled to SS7 network 14 and switching networks 18 to provide wireless telecommunications services to wireless service customers 26. Wireless telephone system 22 may include a wireless or cellular switch 24 residing in a mobile telecommunications switching office (MTSO). Wireless telephone system 22 encompassing one or more MTSO may include a number of land-based transmission towers 28 and/or satellite-based wireless transponders (not shown). According to the teachings of the present invention, a call management platform 50 is coupled to wireless switch 24 to provide live call management therefor. Preferably, call management platform 50 is co-located with wireless switch 24 or located on-site with wireless switch 24. The communications span between wireless switch 24 and call management platform 50 may be a T1 line, an SS7 link set, or any other suitable medium operating according to any other suitable communications protocol. Call management platform 50 is also coupled to a frame relay network 90.

A directory assistance service provider 20 is coupled to SS7 network 14, switching networks 18, and frame relay network 90. A database 16 for storing telephone numbers is coupled to directory assistance service provider 20.

It is important to note that call management platform 50 may also be coupled to switching networks 18 to provide live call management to non-wireless telecommunications systems in a similar manner. Although the detailed description below is directed toward applications to a wireless telecommunications system, the discussion is equally applicable to a non-wireless telecommunications system.

Figure 2:
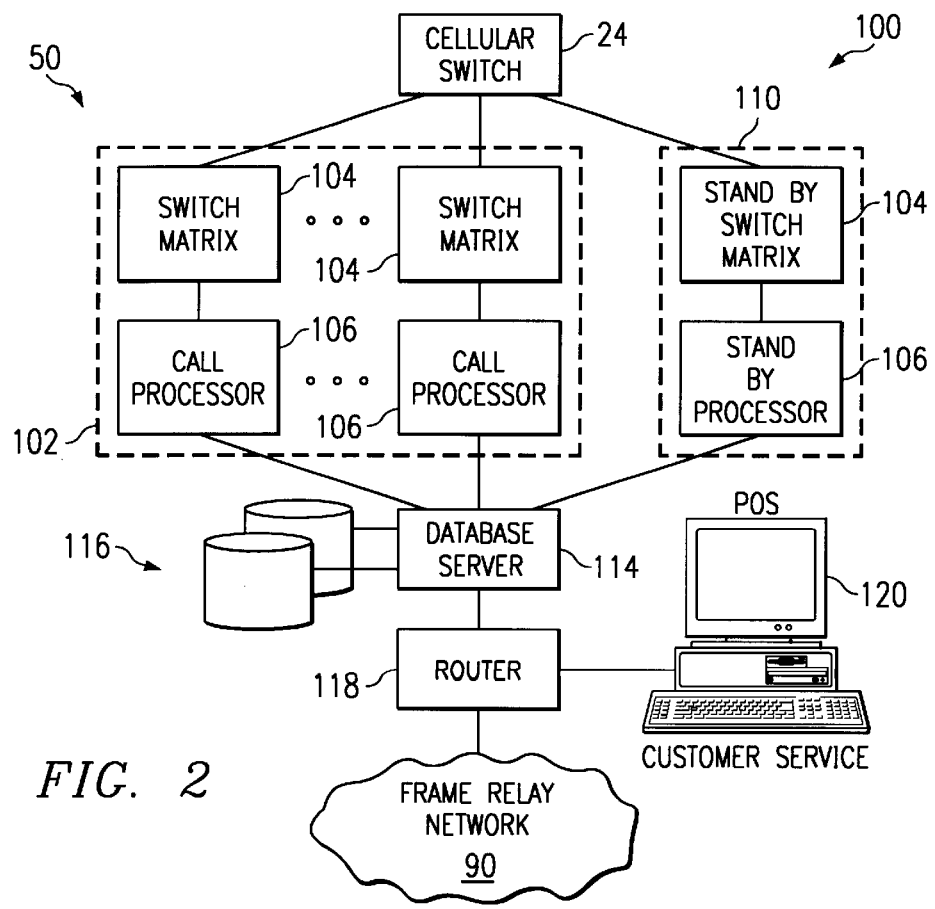
FIG. 2 is a block diagram of an exemplary wireless platform according to the teachings of the present invention.

FIG. 2 is a block diagram of an exemplary call management platform 50 according to the teachings of the present invention. Call management platform 50 includes a primary call manager unit 102 and an optional backup call manager unit 110. Primary call manager unit 102 may include one or more switch matrices 104, each being coupled to a respective call processor 106. Call processors 106 provide voice prompts and announcements, account balance computations, call progress monitoring, and call blocking. Multi-lingual voice announcements may be configured to meet the customer's preference.

Backup call manager 110 may be similarly constructed with one or more standby switch matrices 104 and a standby processor 106. The number of standby switch matrices and standby call processors is dependent on the level of 30 redundancy required, which may be 1:1, 2:1, 3:1, etc. Switch matrices 104 may be implemented with Nortel® Meridian® switches and other switches of similar operational characteristics and functionality.

It may be seen that primary and standby call manager units 102 and 110 may be implemented by only a computing processor if call management platform 50 is more highly integrated with the carrier's switch 24, so that the functionality of switch matrix 104 is carried out thereby.

Primary and standby call manager units 102 and 110 are preferably co-located with wireless switch 24 and are coupled thereto via a same backplane or a T1, SS7, or any other suitable link. Call processors 106 are further coupled to a database server 114, which maintains a pair of mirrored databases 116 to provide redundancy and ensure the integrity of the data. Database server 114 and call processors 106 may be implemented by any processor unit with adequate processing capacity and speed, and may be a personal computer, a workstation, a mini-computer, or the like. Database server 114 is further coupled to a router 118 which provides data and message routing functions between call management platform 50 and customer service/system administration/POS terminals 120 via a local area network (LAN), and to customer interface facilities 62 (FIG. 2) via frame relay network 90.

In operation, call management platform 50 may accept dual-tone multifrequency (DTMF), multifrequency (MF), or primate rate addressing protocols from wireless switch 24. When wireless switch 24 recognizes the call is for directory assistance, it transfers the call to call management platform 50. If the call is associated with a prepay account as recognized by the mobile identification number (MIN), the call management platforms account balance verification, individual account processing requests, and then routes the call back to the wireless carrier for call completion.

Because call management platform 50 is directly coupled to the wireless carrier's switch and resides in close proximately or on-site with the wireless switch, local calls stay within the carrier's network. Further, customer data is readily accessible by the wireless switch's personnel via a LAN connection or a local dial-up protocol. More importantly, live in-call management is possible to avoid unnecessary credit exposure.

Figure 3:
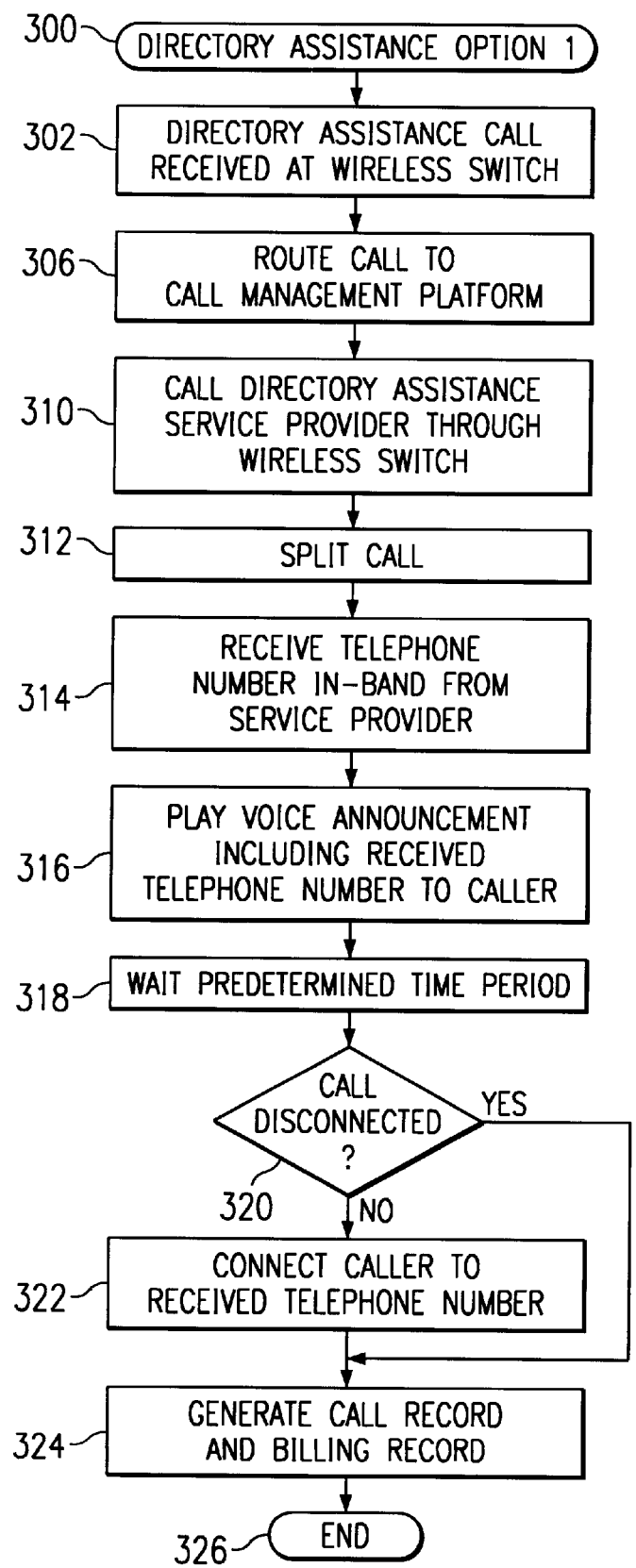
FIG. 3 is a flowchart of an embodiment of an exemplary directory assistance call processing according to the teachings of the present invention.

Referring to FIG. 3, a flowchart of one embodiment of a directory assistance process 300 is shown. Directory assistance process 300 may be executed on call management platform 50 shown in FIGS. 1 and 2 and described above. A call for directory assistance placed through a wireless handset is received at the wireless switch, as shown in block 302. The directory assistance call is recognizable by the dialed number, which is typically "411" or "555–1212." In most cases, a prefix of a "1", indicating a toll call is required. Upon receipt of a directory assistance call, the call is routed to the call management platform coupled to the wireless switch, as shown in block 306.

Thereafter, a call to a directory assistance service provider is made through the wireless switch and via the switching networks, typically by calling a toll free 1-800 number, as shown in block 310. The caller is then prompted either by a human operator or a voice recognition system (not shown) to provide the information needed to look up the destination number, typically a name of a person or business and a city location. At this point, the call is split so that the caller is essentially put on hold, as shown in block 312. The directory assistance service provider returns a telephone number using in-band signaling to the call management platform, as shown in block 314. The caller cannot hear this in-band transaction because the call has been split. The call to the directory assistance service provider is then disconnected.

The call management platform receives the destination number in-band and provides the destination number as part of a voice announcement to the caller, as shown in block 316. The voice announcement may additionally inform the caller that a call to the destination number may be placed automatically for a fee if the caller stays on the line. The call management platform waits a predetermined time period for the caller to hang up, as shown in block 318. If the call has not been disconnected by the caller after the predetermined time period, as determined in block 320, then the call management platform connects the caller to the received destination number, as shown in block 322. Finally, a call data record and/or a billing record is generated to bill for the directory assistance call and the automatic connection to the destination number, as shown in block 324. The process ends in block 326.

Figure 4:
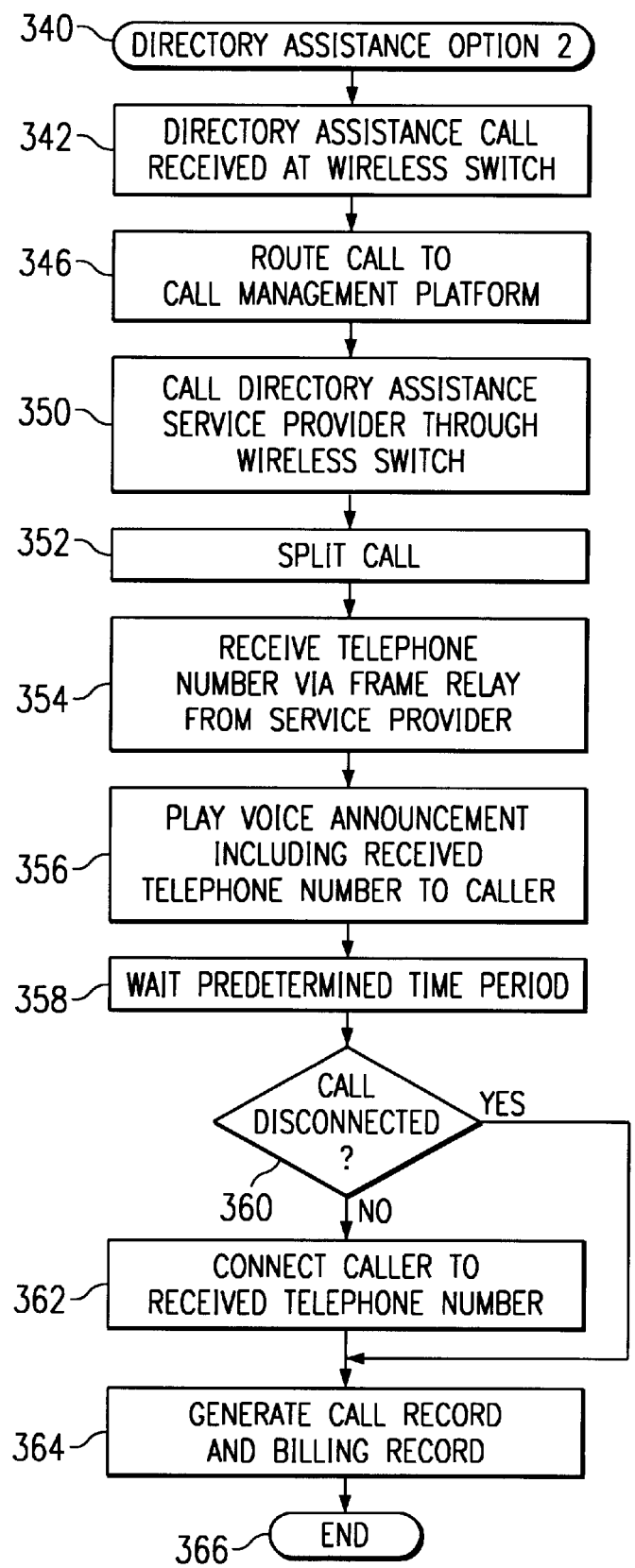
FIG. 4 is a flowchart of another embodiment of an exemplary directory assistance call processing according to the teachings of the present invention.

Referring to FIG. 4, a flowchart of another embodiment of a directory assistance process 340 is shown. Directory assistance process 340 may be executed on call management platform 50 shown in FIG. 1 and described above. A call for directory assistance placed through a wireless handset is received at the wireless switch, as shown in block 342. Upon receipt of a directory assistance call, the call is routed to the call management platform coupled to the wireless switch, as shown in block 346. Thereafter, a call to a directory assistance service provider is made through the wireless switch and via the switching networks, typically by calling a toll free 1-800 number, as shown in block 350. The caller is then prompted either by a human operator or a voice recognition system (not shown) to provide the information needed to look up the destination number, typically a name of a person or business and a city location. The call is then split so that the caller is essentially put on hold, as shown in block 352. The directory assistance service provider returns a telephone number via frame relay network 90 (FIG. 1) to the call management platform, as shown in block 354. The call to the directory assistance service provider is then disconnected.

The returned destination number is provided as part of a voice announcement to the caller by the call management platform, as shown in block 356. The voice announcement may additionally inform the caller that a call to the destination number may be placed automatically for a fee if the caller stays on the line. The call management platform waits a predetermined time period for the caller to hang up, as shown in block 358. If the call has not been disconnected after the predetermined time period, as determined in block 360, then the call management platform connects the caller to the received destination number, as shown in block 362. A call data record and/or billing record is generated for the directory assistance service and the automatic call connection, if applicable, as shown in block 364. The process ends in block 366.

Referring to FIG. 5, a flowchart of yet another embodiment of a directory assistance process 380 is shown. Directory assistance process 380 may be executed on call management platform 50 shown in FIG. 1 and described above. A call for directory assistance placed through a wireless handset is received at the wireless switch, as shown in block 382. Upon receipt of a directory assistance call, the call is routed to the call management platform coupled to the wireless switch, as shown in block 386. Thereafter, the directory assistance service provider is contacted via frame relay network 90 (FIG. 1), as shown in block 390. The caller is then prompted either by a human operator or a voice recognition system (not shown) to provide the information needed to look up the destination number, typically a name of a person or business and a city location. The directory assistance service provider returns a telephone number, also via frame relay network 90 to the call management platform, as shown in block 392. The returned destination number is then provided in a voice announcement to the caller by the call management platform, as shown in block 394. The voice announcement may additionally inform the caller that a call to the destination number may be placed automatically for an additional fee if the caller stays on the line. The call management platform waits a predetermined time period for the caller to hang up, as shown in block 396. If the call has not been disconnected after the predetermined time period, as determined in block 398, then the call management platform connects the caller to the received destination number, as shown in block 400. The call management platform then generates a call record and/or billing record, as shown in block 402. The process ends in block 404.

Operating in this manner, telephone customers have access to directory assistance and can be connected to the destination number efficiently without wasting unnecessary telephony bandwidth.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A method of providing directory assistance service, said method comprising in sequence:
   a call management platform receiving from a separate telecommunications carrier switch an origination call placed by a caller;
   said call management platform connecting the origination call to a directory assistance service provider separate from the telecommunications carrier switch via an extension call between the call management platform and the directory assistance provider through the telecommunications carrier switch;
   said call management platform splitting the origination call from the extension call to the directory assistance service provider so that the caller no longer has an end-to-end connection with the directory service provider;
   said call management platform receiving a destination number from the directory assistance service provider via the extension call and then disconnecting the extension call to the directory assistance service provider; and
   said call management platform providing the destination number to the caller in the origination call.

2. The method, as set forth in claim 1, wherein the step of receiving the destination number comprises receiving the destination number in-band.

3. The method, as set forth in claim 1, wherein the step of receiving the destination number comprises receiving the destination number via a data network.

4. The method, as set forth in claim 1, wherein the step of connecting the origination call to a directory assistance service provider comprises originating the extension call by calling a 1-800 number.

5. The method of claim 1, and further comprising:
   said call management platform automatically connecting the origination call to the destination number via the telecommunications carrier switch if the origination call has not been disconnected within a predetermined time period from said call management platform providing the destination number.

6. The method of claim 5, further comprising:
   starting a call duration timer;
   monitoring the origination call automatically connected to the destination number for the call duration timer reaching the maximum allowable call duration or disconnection of the origination call by the caller;
   disconnecting the origination call in response to the call duration timer reaching the maximum allowable call duration;
   determining an amount expended by the origination call immediately in response to call disconnection; and
   immediately deducting the amount from the customer account balance.

7. The method of claim 6, further comprising:
   looking up customer account balance associated with the origination call in a customer data database; and
   determining the maximum allowable call duration in response to the customer account balance.

8. The method of claim 5, and further comprising said call management platform preparing a call record for the directory assistance service and, if the origination call was automatically connected to the destination number, the automatic connection service.

9. A call management platform providing directory assistance, comprising:
   means for receiving from a separate telecommunications carrier switch an origination call placed by a caller;
   means for connecting the origination call to a directory assistance service provider separate from the telecommunications carrier switch via an extension call between the call management platform and the directory assistance provider through the telecommunications carrier switch;
   means for splitting the origination call from the extension call to the directory assistance service provider so that the caller no longer has an end-to-end connection with the directory service provider;
   means for receiving a destination number from the directory assistance service provider via the extension call after splitting the origination and extension calls and for then disconnecting the extension call to the directory assistance service provider; and
   means for providing the destination number to the caller in the origination call.

10. The call management platform of claim 9, and further comprising:
   means for automatically connecting the origination call to the destination number via the telecommunications carrier switch if the origination call has not been disconnected within a predetermined time period from said call management platform providing the destination number.

11. The call management platform of claim 9, further comprising:
- means for starting a call duration timer;
- means for monitoring the origination call automatically connected to the destination number for the call duration timer reaching the maximum allowable call duration or disconnection of the origination call by the caller;
- means for disconnecting the origination call in response to the call duration timer reaching the maximum allowable call duration;
- means for determining an amount expended by the origination call immediately in response to call disconnection; and
- means for immediately deducting the amount from the customer account balance.

12. The call management platform of claim 11, further comprising:
- means for looking up customer account balance associated with the origination call in a customer data database; and
- means for determining the maximum allowable call duration in response to the customer account balance.

13. The call management platform of claim 9, and further comprising means for preparing a call record for the directory assistance service and, if the origination call was automatically connected to the destination number, the automatic connection service.

14. The call management platform of claim 9, wherein the means for receiving the destination number comprises means for receiving the destination number in-band.

15. The call management platform of claim 9, wherein the means for receiving the destination number comprises means for receiving the destination number via a data network.

16. The call management platform of claim 9, wherein the means for connecting the origination call to a directory assistance service provider comprises means for originating the extension call by calling a 1-800 number.

17. A system, comprising:
- a call management platform according to claim 9; and
- a separate telecommunications carrier switch coupled to said call management platform.

* * * * *